Dec. 30, 1930.  M. M. McGONIGAL  1,786,500
SANITARY MILK STRAINER
Filed Oct. 14, 1929
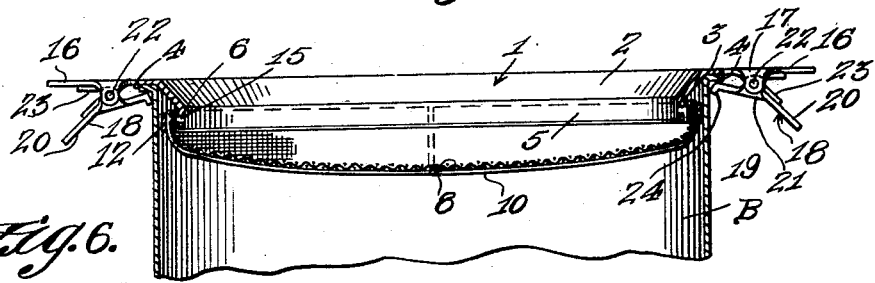
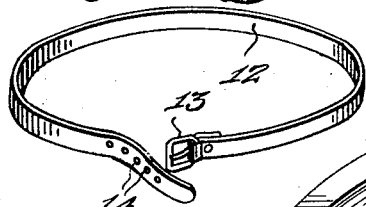
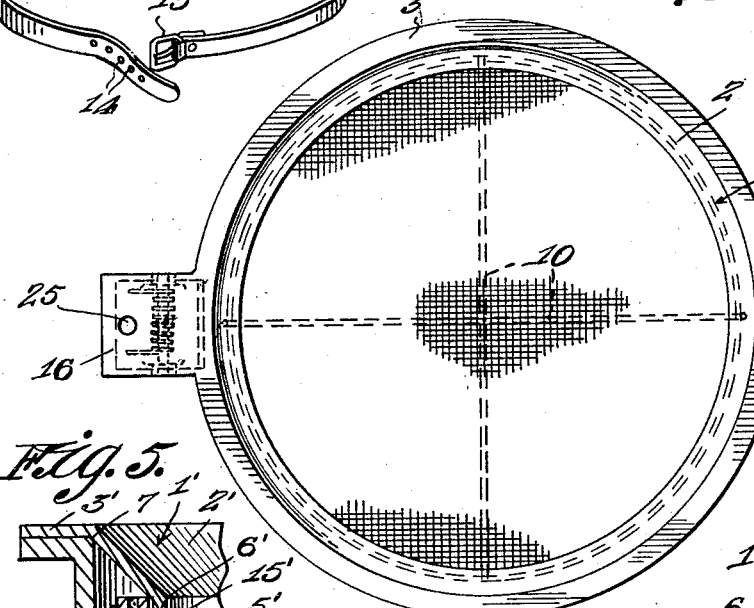
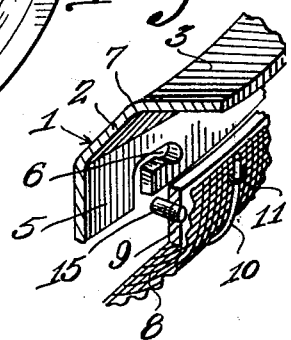
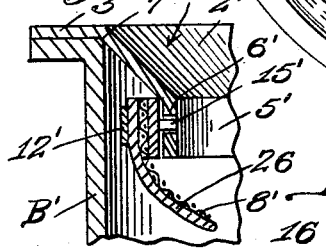
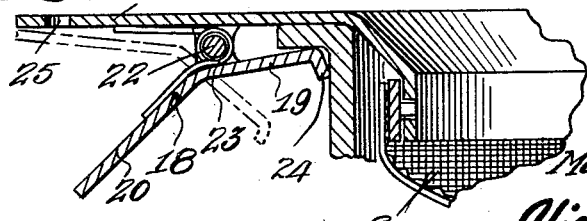
Mary M. McGonigal, INVENTOR
BY Victor J. Evans ATTORNEY Patented Dec. 30, 1930

1,786,500

UNITED STATES PATENT OFFICE

MARY M. McGONIGAL, OF GANNETT, IDAHO

SANITARY MILK STRAINER

Application filed October 14, 1929. Serial No. 399,604.

This invention relates to improvements in milk strainers for cream separators, although not strictly confined to this use, and the general object of the invention is to provide a sanitary milk strainer which may be made in different sizes and applied to separator bowls of different sizes, and which may be employed, also, when inverted, as a fly and dust proof cover for the separator parts and bowl when the latter are washed or cleansed.

Another object of the invention is to provide a strainer of this class so constructed that the screen of the strainer may be readily assembled with the supporting rim of the device and separated therefrom when desired without the employment of any securing means, which would be liable to become rusted or corroded or liable to collect dirt.

Another object of the invention is to provide a novel means whereby the marginal portion of the screen may be securely held in engagement about the supporting rim of the separator.

This invention also consists in certain other features of construction and in the combination and arrangement of the several parts, to be hereinafter fully described, illustrated in the accompanying drawing and specifically pointed out in the appended claims.

In describing my invention in detail, reference will be had to the accompanying drawing wherein like characters denote like or corresponding parts throughout the several views, and in which:—

Figure 1 is a vertical diametric sectional view thru the strainer embodying the invention, mounted upon the open top of a separator bowl.

Figure 2 is a top plan view of the strainer.

Figure 3 is a detail vertical sectional view thru one side of the strainer illustrating the means provided for holding the rim of the strainer upon the upper margin of the wall of a separator bowl.

Figure 4 is a fragmentary sectional perspective view illustrating the means for connecting the band of the screen of the strainer with the supporting rim of the strainer.

Figure 5 is a detail fragmentary sectional view, illustrating a slight modification of the invention.

Figure 6 is a perspective view of the belt constituting a part of the strainer of the invention.

The strainer embodying the invention includes, in its construction, a supporting rim, which is indicated in general by the numeral 1 and which is of annular or other form depending upon the marginal contour of the open top of the bowl or other receptacle with which the rim is to be employed. The rim comprises an annular body portion 2, which is inclined or tapered downwardly and which is provided at its upper edge with an outstanding substantially horizontal flange 3, which is designed to rest upon the usual flange 4, which outstands from the upper edge of the wall of the separator bowl or other receptacle, which is indicated by the reference letter B in the drawing. The body portion 2 of the rim is provided at its lower edge with a depending circumferential flange 5 which is formed at intervals in its circumference with bayonet slots 6 the open ends of which open through the lower edge of the said flange 5. The flange 3 of the rim is preferably of a width the same as the flange at the top of the wall of the separator bowl, so that when the rim is disposed within the upper end of the bowl, the periphery of the flange 3 will register with that of the said flange upon the bowl and in forming the rim, the bend 7 will be formed at the line of juncture of the flange 3 with the body portion 2, and it will be observed by reference to Figures 1, 3 and 5 of the drawing that this bend constitutes a means by which the rim is centered and held against displacement when disposed in position resting upon the open top of the bowl.

The screen of the strainer is indicated by the numeral 8 and comprises a dished circular body of fine wire mesh and preferably of a metal which will not rust or corrode. The numeral 9 indicates an annular band of non-corrosive metal which is interiorly of the same diameter as the exterior diameter of the flange 5 of the rim 1 and it will be observed by reference to the drawing that the marginal portion of the screen 8 is disposed to surround this band, wires 10 being arranged in crossed relation extending at right angles to each other beneath the dished screen, so as to reenforce and prevent sagging of the bottom thereof, and being secured at their ends by U-shaped rivets or similar fastenings 11 to the band 9. In order to provide further against separation of the marginal portion of the screen from the band, a strap which is shown in detail in Figure 6 and which is indicated by the numeral 12 is preferably provided and this strap is of a rubber composition so that it will possess a desirable degree of elasticity, and the strap is provided at one end with an ordinary buckle, indicated by the numeral 13, and is formed at its other end portion, which is engageable with the buckle, with openings 14 arranged in a longitudinal series, as customary, for engagement by the tongue of the buckle.

This strap is applied about the said marginal portion of the screen 8 as is best shown in Figure 5 of the drawing.

In order that the band 9 may be held in place upon the flange 5 when fitted thereto, the said band is provided at intervals in its circumference with inwardly projecting studs 15, which are spaced apart the same distance as the bayonet slots 6 so that in assembling the rim 1 and band 9 all of the studs may be simultaneously engaged in the said slots.

As a means for retaining the rim 1 in place upon the open top of the bowl B, the flange 3 of the rim is preferably provided at diametrically opposite points, with outstanding horizontally disposed extensions 16 having spaced apertured ears 17 at their side edges, and a clamping member 18 comprising a plate including a clamping portion 19 and finger pieces 20 which are disposed at an obtuse angle to each other and are connected with the extension 16 by the provision, substantially at the juncture of the portions 19 and 20, by perforated ears 21 through which ears 17 is secured a pintle pin 22, a wire spring 23 being coiled about the pintle pin 22 and having its ends engaging one against the under side of the extension 16 and the other against the finger piece 20 of the clamping member 18. The clamping member 18 at the free end of its portion 19 is provided with an overturned flange 24 which, as will be observed by reference to Figures 1 and 3 of the drawings, is designed beneath the flange at the top of the bowl B, and the wall of the bowl adjacent its point of engagement with the said flange. The spring 23 serves of course to yieldably hold the clamping member 18 substantially in the position shown in Figures 1 and 3 of the drawing so that, when the rim 1 is assembled with the top of the bowl and the member 18 is relieved of pressure against its finger piece 20, the spring will, by binding at its upper end 24 against the under side of the flange at the top of the bowl B, act to securely clamp the rim 1 in place upon the bowl top.

As a matter of convenience, the extension 16 at one side of the rim 1 may be formed with an opening indicated by the numeral 25 and of such size as to adapt this part of the rim to be engaged with a suspension hook or a nail whereby the strainer may be hung up upon a wall when not in use.

Figure 5 of the drawing discloses a slight modification of the invention and in this figure parts corresponding to parts in the previously described figures are indicated by reference numerals primed, and, as shown in this figure, a strainer pad 26 of cotton cloth or the like is disposed to extend over and snugly fit the under side of the screen 8' the marginal portion of this strainer being held in place by the strap 12'.

What I claim is:—

1. A strainer of the class described comprising a rim for disposal in the open top of a receptacle for the liquid to be strained having an outstanding circumferential flange to rest upon the upper margin of the wall of the receptacle, and a circumferential portion inclined downwardly and inwardly from said flange and provided with a depending flange having bayonet slots therein, a dished screen of fine mesh, a ring about the outer side of which the upper margin of the screen is fitted, and studs upon the inner side of the ring engaged in said slots to separably connect the ring with the flange of the rim.

2. A strainer of the class described comprising a rim for disposal in the open top of a receptacle for the liquid to be strained having an outstanding circumferential flange to rest upon the upper margin of the wall of the receptacle, and a circumferential portion inclined downwardly and inwardly from said flange and provided with a depending flange having bayonet slots therein, a dished screen of fine mesh, a ring about the outer side of which the upper margin of the screen is fitted, studs upon the inner side of the ring engaged in said slots to separably connect the ring with the flange of the rim, the said outstanding flange of the rim being provided at diametrically opposite points in its circumference with outstanding extensions, and clamping means upon said extensions for clamping engagement with the outstanding flange at the upper margin of the wall of the receptacle.

3. A strainer of the class described comprising a rim for disposal in the open top of a receptacle for the liquid to be strained having an outstanding circumferential flange to rest upon the upper margin of the wall of the receptacle, and a circumferential portion inclined downwardly and inwardly from said flange and provided with a depending flange having bayonet slots therein, a dished screen of fine mesh having its convex side presented downwardly, a ring about the outer side of which the upper margin of the screen is fitted, studs upon the inner side of the ring engaging in said slots to suitably connect the ring with the flange of the rim, the said outstanding circumferential flange of the rim being provided, at diametrically opposite points with radial extensions, ears upon the under side of each extension, a pivot pin mounted in said ears, a clamping member mounted at its upper side upon the pivot pin and having portions disposed at an obtuse angle with respect to each other, one of said portions being engageable beneath the flange at the open top of the receptacle and having a downturned terminal portion to engage against the outer side of the wall of the receptacle below the flange, the other portion constituting a finger piece, and a spring coiled about the pivot pin and having one end bearing against the under side of the extension and its other end against the upper side of the last mentioned portion of the clamping member.

In testimony whereof I have affixed my signature.

Mrs. MARY M. McGONIGAL.